(12) United States Patent
Kobayashi

(10) Patent No.: US 7,257,510 B2
(45) Date of Patent: *Aug. 14, 2007

(54) METHOD AND APPARATUS TO MEASURE AMOUNT OF MOVEMENT USING GRANULAR SPECK PATTERN GENERATED BY REFLECTING LASER BEAM

(75) Inventor: Kenichiro Kobayashi, Machida (JP)

(73) Assignee: Kabushiki Kaisha Toyoseikiseisakusho, Tokyo (JP)

( * ) Notice: Subject to any disclaimer, the term of this patent is extended or adjusted under 35 U.S.C. 154(b) by 23 days.

This patent is subject to a terminal disclaimer.

(21) Appl. No.: 10/958,807

(22) Filed: Oct. 5, 2004

(65) Prior Publication Data

US 2005/0049817 A1 Mar. 3, 2005

Related U.S. Application Data

(63) Continuation of application No. 09/838,905, filed on Apr. 20, 2001, now Pat. No. 6,847,910.

(30) Foreign Application Priority Data

Apr. 26, 2000 (JP) .............................. 2000-166833

(51) Int. Cl.
*G01D 1/00* (2006.01)
(52) U.S. Cl. ...................................................... 702/127
(58) Field of Classification Search ................ 702/127; 356/502, 609
See application file for complete search history.

(56) References Cited

U.S. PATENT DOCUMENTS

| 4,621,063 | A |   | 11/1986 | Wyatt et al. |
| 4,794,384 | A |   | 12/1988 | Jackson |
| 4,798,469 | A | * | 1/1989 | Burke .......................... 356/609 |
| 4,824,250 | A | * | 4/1989 | Newman ....................... 356/502 |
| 5,343,287 | A |   | 8/1994 | Wilkins |
| 5,633,714 | A |   | 5/1997 | Nyyssonen |
| 5,864,944 | A |   | 2/1999 | Kashiwagi et al. |
| 6,248,994 | B1 |   | 6/2001 | Rose et al. |
| 6,424,407 | B1 |   | 7/2002 | Kinrot et al. |
| 2002/0080264 | A1 |   | 6/2002 | Konno |

FOREIGN PATENT DOCUMENTS

| DE | 19620419 |   | 11/1997 |
| DE | 19739679 |   | 10/1998 |
| DE | 19909235 |   | 9/1999 |
| DE | 19817664 |   | 11/1999 |
| FR | 2701762 |   | 8/1994 |
| JP | 07110216 A | * | 4/1995 |
| JP | 09049706 A | * | 2/1997 |

* cited by examiner

*Primary Examiner*—John Barlow
*Assistant Examiner*—Xiuqin Sun
(74) *Attorney, Agent, or Firm*—Price, Heneveld, Cooper, DeWitt & Litton, LLP

(57) ABSTRACT

A granular speck pattern is generated by a reflecting laser beam as an object to be measured is irradiated with a laser beam. This granular speck pattern is directly picked up as image index by a line sensor. An A/D converter converts an analog signal supplied from the line sensor to a digital signal, a processing unit calculates the amount of movement of the object on the basis of movement of a pixel interval of the granular speck pattern. A display device displays the amount of movement calculated by said processing unit.

24 Claims, 2 Drawing Sheets

METHOD AND APPARATUS TO MEASURE AMOUNT OF MOVEMENT USING GRANULAR SPECK PATTERN GENERATED BY REFLECTING LASER BEAM

CROSS-REFERENCE TO RELATED APPLICATION

The present application is a continuation of U.S. patent application Ser. No. 09/838,905, filed Apr. 20, 2001, entitled METHOD AND APPARATUS TO MEASURE AMOUNT OF MOVEMENT USING GRANULAR SPECK PATTERN GENERATED BY REFLECTING LASER BEAM, now U.S. Pat. No. 6,847,910.

BACKGROUND OF THE INVENTION

1. Field of the Invention

The present invention relates to a method and an apparatus adapted to measure an amount by which an object to be measured has moved in plane and back-and-forth in non-contacting fashion at a high speed without a demand for particular index or mark substantially freely from conditions of said object such as temperature, color or material thereof.

Irradiation of the object to be measured with a monochromatic laser beam having high directivity, high luminance and linearity generates a granular speck pattern upon its reflection. This granular speck pattern depends on a degree of roughness on the surface of the object irradiated with the laser beam. The granular speck pattern translates in proportion to expansion or extension as the object is heated or an external stress is exerted on the object. On the other hand, the granular speck pattern is reduced or magnified as the object moves back-and-forth.

The present invention intends to pick up this granular speck pattern in direct and optical manner as an index, to calculate a movement of the object with respect to said index and to display the calculated result as the amount of movement.

2. Description of the Related Art

A non-contact method for such measurement is well known in which the object is irradiated with a laser beam vertically to the object and there are provided a pair of unidimensional sensors at an angle of 45° about the normal line, respectively.

Irradiation of the object with a laser beam results in generation of the granular speck pattern due to interference of scattering light. Output of the respective unidimensional sensors is used as a reference signal to observe movement of the granular speck pattern as the surface of the object is moved or distorted. Such movement is photoelectrically detected at two points and a differential movement between these two points is obtained to automatically eliminate a rigid body movement component. This so-called cross correlating method is used to determine a distortion.

According to another method of prior art, a darkroom is used as the measurement environment and a granular speck pattern generated by the reflecting laser beam is projected on a screen in the form of frosted glass. This projected pattern is picked up by a digital camera or the like, then a granular speck is selectively extracted by a computer and the amount of movement of the object in a plane is determined on the basis of an amount by which a granular point thereof has moved.

A high accuracy is required for the optical parts as well as the optical system mechanism in the case of the method as has been described above for calculating an amount of distortion or movement from interference fringes.

In addition, when a correlative peak value and a reference signal value determined by the cross correlating method is lower than a threshold value, processing is inevitably complicated and becomes troublesome. The measurement environment in the form of a darkroom is essential for projection on the screen formed by frosted glass.

SUMMARY OF THE INVENTION

The present invention aims to eliminate the restriction by many requirements for the prior art concerning the construction and the measurement environment. To achieve this, the present invention aims to simplify the respective means in the method as well as the apparatus for measurement and to enlarge a range restricted depending on the type of the object to be measured. The method and the apparatus according to the present invention should be able to measure even the object moving at a high speed by substantially simplifying the image processing in comparison to the prior art.

The object set forth above is achieved by the method and the apparatus according to the present invention in which a granular speck pattern is generated by a reflecting laser beam as an object to be measured is irradiated with a laser beam. This granular speck pattern is easily and directly picked up as an image in a measurement environment like an ordinary office and the problem is solved on the basis of a quantitative relationship between the object and the granular speck pattern generated by the reflecting laser beam.

The object set forth above is achieved, according to one aspect of the invention, by a method for measuring an amount at which an object to be measured has moved without demand for a particular index or mark in non-contacting fashion, said method comprising steps of irradiating an object to be measured with a laser beam, optically and directly picking up the granular speck pattern generated by the reflecting laser beam as an index, calculating the amount of movement on the basis of movement of the granular speck pattern with respect to said index and displaying a result of the calculation as a numerical value of the measured amount of movement.

The object set forth above is achieved, according to another aspect of the invention, by an apparatus for measuring an amount at which an object to be measured has moved in plane in non-contacting fashion said apparatus comprising a laser projector adapted to generate a granular speck pattern corresponding to a rough surface of an object to be measured, a line sensor adapted to directly pick up said granular speck pattern as an index, an A/D converter adapted to convert an analog signal supplied from said line sensor to a digital signal, a processing unit adapted to calculate an amount of movement of said object on the basis of movement of the granular speck in said pattern with respect to a pixel interval of said granular speck pattern picked up by said line sensor and represented by said A/D converted signal and a display device adapted to display the amount of movement calculated by said processing unit.

The present invention generally comprises four elements. A first element is to irradiate an object to be measured with a laser beam. A second element is to pick up a granular speck pattern generated by reflection of the laser beam with which the object is irradiated. A third element is to quantify movement of the object and the picked up granular speck pattern and to use this quantified movement for a specific machine or apparatus. A fourth element is to compare the picked up granular speck pattern with pixels of the line sensor to calculate an amount of movement and to display this as a substantial amount of movement.

These elements will be now described in combination with one another. The object is irradiated with the laser beam to generate the granular speck pattern corresponding to the rough surface of said object. One array of random white and black images is continuously picked up by the line sensor as the object moves and a granular speck in said white and dark images is selectively recognized. This speck is followed in a time series fashion by the computer and the movement is processed in real time on the basis of the pixel interval in the line sensor. A numerical value of movement obtained in this manner is displayed. For an extremely large amount of movement, a granular speck lying within a picking up range of the line sensor is repeatedly selected as a new index immediately before the previously selected granular speck as the index deviates from the pick up range of the line sensor. In this way, movement of the object can be continuously measured.

The measuring instrument achieving the present invention comprises a semiconductor laser projector, a line sensor provided with a shielding tube adapted to shield extraneous light and allowing only the granular speck pattern to pass therethrough, a video signal branching device adapted to branch the video signal picked up by the line sensor in two, a monitor device adapted to display the video signal picked up by the line sensor, an A/D (Analog/Digital) converter, a processing unit comprising a computer, and a display device adapted to display the amount of movement.

Irradiating the surface of the object to be measured with a monochromatic laser beam of high linearity, luminance, directivity and coherence generates the granular speck pattern due to coherence of the laser beam exactly depending on the roughness of the surface irradiated with the laser beam.

The granular speck pattern translates as the object contracts and the granular speck pattern is proportionally reduced or magnified as the object moves back-and-forth with respect to the measuring instrument. The granular speck pattern generated by the reflecting laser beam is exactly depending on the roughness of the surface irradiated with the laser beam. In other words, the same granular speck pattern is reproduced when the same position of the object is irradiated with the laser beam being the same in emission waveform as well as in beam diameter using same picking up element.

This granular speck pattern is continuously picked up by the line sensor as the index, the analog signal supplied from the line sensor is converted by the A/D converter to the corresponding digital signal which is, in turn, input to the processing unit, in which an amount of movement of the granular speck pattern in plane is calculated or an amount of back-and-forth movement on the basis of a ratio of reduction or magnification, and a result of calculation is displayed as a substantial amount by which the object has moved.

DETAILED DESCRIPTION OF THE PREFERRED EMBODIMENTS

Figure 1:
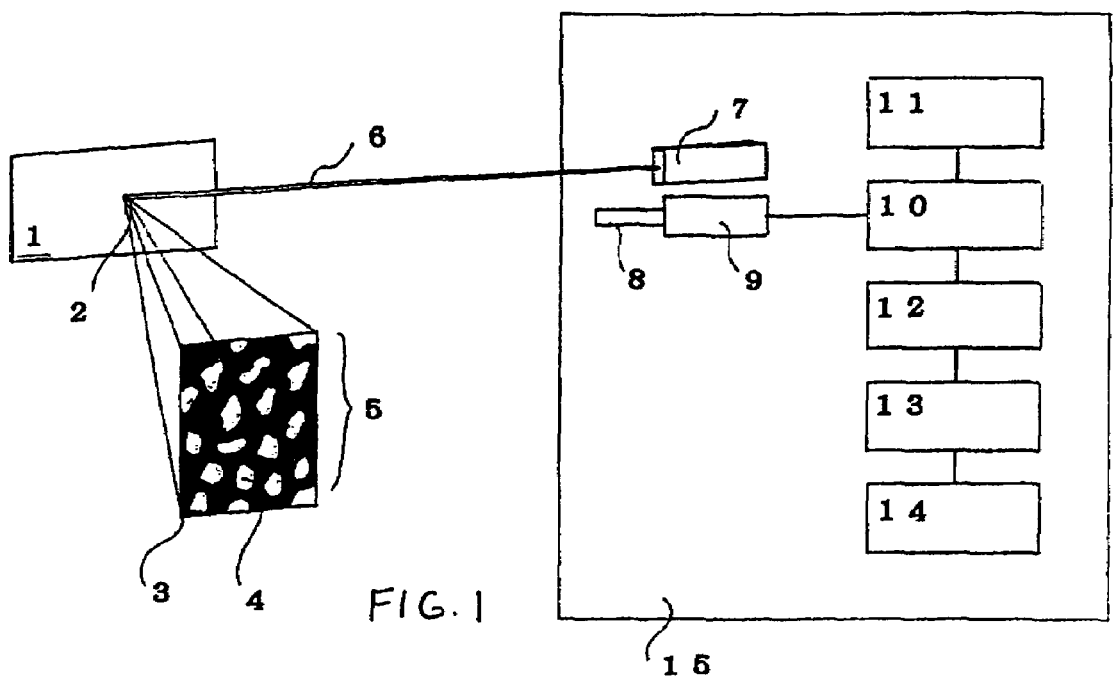
FIG. 1 illustrates an embodiment of the present invention.

Before a preferred embodiment of this invention is described in reference with FIG. 1 of the accompanying drawings, details of an object to be measured and of respective components' types as well as functions will be described.

Respective reference numerals designate elements as follows: 1—object to be measured; 2—laser irradiated surface; 3—frosted glass served as screen; 4—one of white specks in imaged granular speck pattern; 5—granular speck pattern; 6—laser beam irradiating the object to be measured; 7—laser projector used to generate the granular speck pattern; 8—shielding tube adapted to shield extraneous light around the granular speck pattern; 9—line sensor adapted to pick up each array of granular speck pattern; 10—video signal branching device adapted to branch video signal representing the granular speck pattern picked up by the line sensor; 11—monitor means adapted for successive display of video signal representing the granular speck pattern picked up by the line sensor; 12—A/D (Analog/Digital) converter adapted to input video signal representing the granular speck pattern picked up by the line sensor to processing unit; 13—processing unit adapted to, depending on particular purpose of application, calculate movement in a plane by using the granular speck pattern as an index, to calculate back-and-forth movement by calculating magnification or reduction ratio of the granular speck pattern, or to identify the object to be measured by checking up the granular speck pattern; 14—display device adapted to real time display a measured movement in plane or back-and-forth movement, or identified object to be measured; 15—measuring instrument having demonstrated functional features of method according to the invention.

The line sensor 9 will be able to pick up the granular speck pattern 5 so far as an operator can visually recognize any amount of laser beam 6 on a surface of the object 1 which is being irradiated with the laser beam 6. The granular speck pattern 5 is generated depending on irregularity on the surface of the object 1 and such granular speck pattern 5 can be picked up even on the mirror-like finished surface of an IC wafer or hard disk even if the irregularity is not remarkable. This is true for the surface of the other materials such as wood, metals, paper, cloth, glass or plastics. However, the granular speck pattern 5 cannot be picked up on the surface of fluid material such as water or mercury. On the surface of coating or adhesive which is in the course of being dried or hardened and therefore unable to maintain its shape, the granular speck pattern 5 is not stabilized at all. The granular speck pattern 5 is progressively stabilized as the time elapses until said coating or adhesive is completely dried or hardened.

As has already been described, reference numeral 2 designates the surface irradiated with a laser beam. Also, reference numeral 3 designates the screen in the form of the frosted glass as used in the conventional picking up method. In the measuring environment in the form of a darkroom, the frosted glass 3 is placed in optical path of the reflecting laser so that the granular speck pattern 5 may be projected on this frosted glass 3 and the image projected in this manner may be picked up by CCD camera or the like.

As has already been described, reference numeral 4 designates one of the white specks in the granular speck pattern 5. Usually it has been difficult for an operator to visually recognize or to directly pick up the granular speck pattern 5 in the environment like an ordinary office. When the CCD camera which is commonly available is used to directly pick up the granular speck pattern 5, the granular speck pattern 5 generated by the laser beam 6 depending on the irregular surface of the object 1 is focussed by an image forming lens. Consequently, the image of the laser beam 6 itself on the object 1 and the granular speck pattern 5 cannot be picked up. To overcome this problem, the image forming lens may be removed from the camera and the reflecting beam may be directly guided to a CCD element or a line sensor element to achieve picking up of the granular speck pattern 5.

The granular speck pattern 5 is the reflecting laser beam depending on the irregularity in the surface of the object 1 and it has conventionally been considered that no granular speck pattern 5 is generated on a mirror-like finished surface. However, even on the surface of the IC wafer which is a typical mirror-like finished surface, the granular speck pattern 5 has recently been picked up in the environment like the ordinary office by using the measuring instrument 15 (laser emission wavelength: 670 nm, 0.6 mW, at a distance of 30 cm from the object 1). In this case, bright and dark contrast of the pattern is deteriorated as the finishing approaches to the degree of mirror-like finishing.

According to the established theory, the average size of the granular speck pattern increases, in general, as the diameter of the laser beam 6 is reduced, and vice versa. But no variation of the average size is observed on the mirror-like finished IC wafer, since the surface of the IC wafer is substantially smooth. While the transparent object 1 has conventionally been considered to be not responsive to irradiation of the laser beam to generate the granular speck pattern, glass or film may be irradiated with the laser beam of high visibility to reliably pick up the granular speck pattern 5 so far as any amount of laser beam can be visually recognized on the surface thereof.

A range of irradiation with the laser beam 6 is enlarged as said laser beam 6 goes away from the laser projector 7. The average area of the granular speck pattern 5 increases as the object 1 goes away from the measuring instrument 15 and vice versa.

With the measuring instrument of 670 nm and 0.6 mW, a collective lens may be moved to vary the beam diameter and to obtain the granular speck pattern 5 having an average area suitable for image processing. While the measuring instrument 15 uses a red laser according to this embodiment, a green or blue laser beam also may be used to vary the average size of the granular speck pattern 5 depending on the particular purpose of the application.

The shielding tube 8 comprises a tube having a diameter of 10 mm and a length in the order of 5 cm and functions to shield the extraneous light around the reflecting laser incident on the line sensor element in the granular speck pattern 5. This shielding tube 8 may be merely placed in front of the line sensor 9 to shield substantially all extraneous light due to, for example, room illumination. Consequently, the granular speck pattern 5 can be directly picked up in an environment like the ordinary office without use of a darkroom as the measuring environment. It has been found that the shielding tube 8 is more effective than an optical band pass filter adapted to pass the emission wavelength of the laser projector 7. It should be understood that the granular speck pattern 5 can be directly picked up in the environment like the ordinary office by placing the shielding tube in front of the CCD element of which the image forming lens has been removed.

The line sensor 9 comprises a plurality of pixels arranged in parallel to the direction in which the object 1 moves and directly picks up movement of the granular speck pattern 5 through the shielding tube 8. The video signal branching device 10 is adapted to branch the video signals representing an array of the granular speck pattern 5 picked up by the line sensor 9 into two groups, one of which is input to the monitor means 11 and the other is input to the A/D converter 12.

The monitor means 11 is adapted to time series display the video signal representing the granular speck pattern 5 input from the line sensor 9. As long as the line sensor 9 and the object 1 are stationary, a linear bar code-like image is displayed in the monitor means 11. This bar code becomes stepped as the object 1 moves and this stepped bar code becomes relatively flat as the speed at which said object 1 moves increases. The granular speck pattern 5 is proportionally enlarged or reduced as the object 1 moves back-and-forth with respect to the measuring instrument 15.

The A/D converter 12 receives the video signal representing the array of the granular speck pattern 5 picked up by the line sensor 9 in the form of analog signal via the video signal branching device 10 and converts this analog signal to the corresponding digital signal to be input to the processing unit 13.

The processing unit 13 comprises a microcomputer and processes the video signal representing the array of granular speck pattern 5 picked up by the line sensor 9 in a manner depending on particular purpose. Reference used to calculate movement of the object 1 is the distance between each pair of the adjacent pixels in the line sensor 9. The line sensor 9 of the measuring instrument 15 has 1024 pixels arranged at intervals of 15 μm and therefore a measurement accuracy in the order of 20 μm. The granular speck pattern 5 displayed in the bar code-like shape becomes stepped as the object 1 is distorted or moved due to its thermal expansion or tension. A white or black speck in the granular speck pattern 5 appearing immediately before said distortion or movement occurs may be selectively recognized and the granular speck pattern 5 newly supplied from the line sensor 9 may be position compared with said while or black speck to detect said distortion or shift in the direction of movement. Such shift may be calculated as the number of pixels of the line sensor 9, and this number of pixels may be multiplied by the pixel interval of 15 μm. Then this product may be multiplied by a correction coefficient derived from a range to be measured and a laser beam diameter to determine an amount of distortion or movement. The granular speck patterns 5 successively supplied from the line sensor 9 may be subjected to the similar processing to determine the amount of distortion or movement in real time mode.

Figure 6:
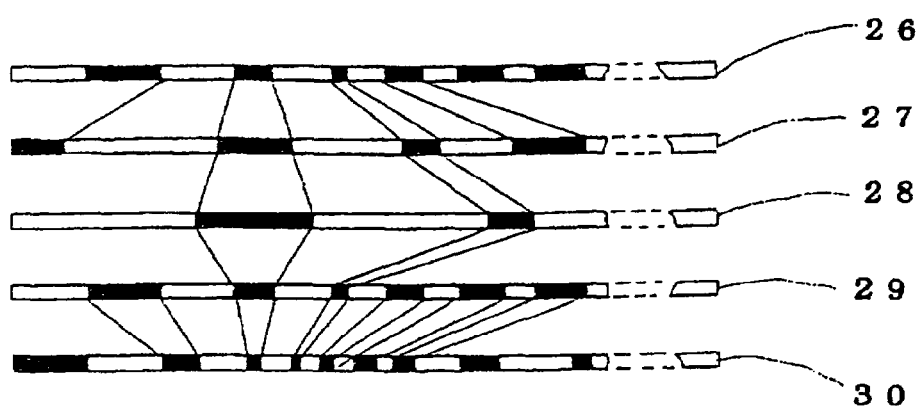
FIG. 6 illustrates the granular speck pattern picked up by the line sensor for an object moving back and forth.

Now calculation of the back-and-forth movement will be described (FIG. 6). A white or black speck in the granular speck pattern 5 supplied from the line sensor 9 immediately before the object 1 moved back-and-forth with respect to the measuring instrument 15 is selectively recognized and calculated using the number of pixels of the line sensor 9 as reference. This white or black speck is stored. Then, the number of pixels constituting the white and black specks in the granular speck pattern 5 newly supplied from the line sensor 9 upon back-and-forth movement of the object 1 is calculated and compared with said stored number of pixels. An increased number of pixels suggests that the object to be measured 1 has moved back from the measuring instrument 15 and a decreased number of pixels suggests that the object 1 has been moved forth toward the measuring instrument 15. An unvaried number of pixels suggests that no movement has occurred. A correction coefficient may be previously established and the increased or decreased number of pixels may be multiplied by this correction coefficient to obtain an actual amount of back-and-forth movement. The granular speck patterns 5 successively received may be subjected to the similar processing to obtain the amount of back-and-forth movement in real time mode. While the method of obtaining the amount of back and forth movement on the basis of increased or decreased number of pixels has been described above, it is also possible to obtain the amount of back-and-forth movement on the basis of increased or decreased number of pixels between the center of a white or black speck pixel and the center of the other white or black pixel.

The display device 14 displays an amount of movement so that an operator can continuously and visually recognize an array of the granular speck pattern 5 on the basis of which the computer has determined that an object 1 has moved in plane or back-and-forth. The display device 14 can also reproduce said array of the granular speck pattern 5.

Figure 2:
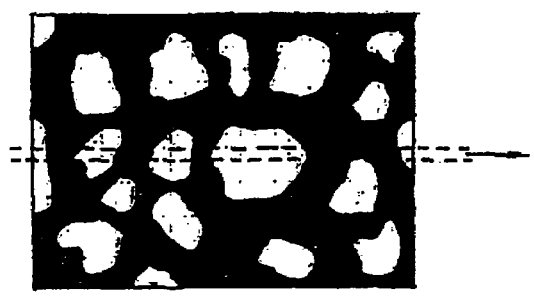
FIG. 2 illustrates the granular speck pattern.

FIG. 2 shows the granular speck pattern 5 picked up by the CCD camera in the form of a binary image containing no intermediate color.

Figure 3:
FIG. 3 illustrates the granular speck pattern picked up by the line sensor and recognized by a processing unit.

FIG. 3 shows the granular speck pattern 5 obtained by picking up said granular speck pattern 5 shown in said FIG. 2 by the line sensor 9.

Figure 4:
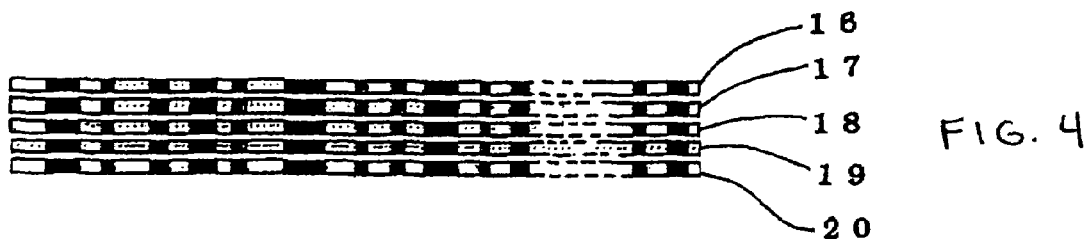
FIG. 4 illustrates the granular speck pattern picked up by the line sensor for an object which is stationary.

FIG. 4 illustrates the bar code-like granular speck patterns 5 successively supplied from the line sensor 9 with respect to the object 1 being stationary in time series mode.

Figure 5:
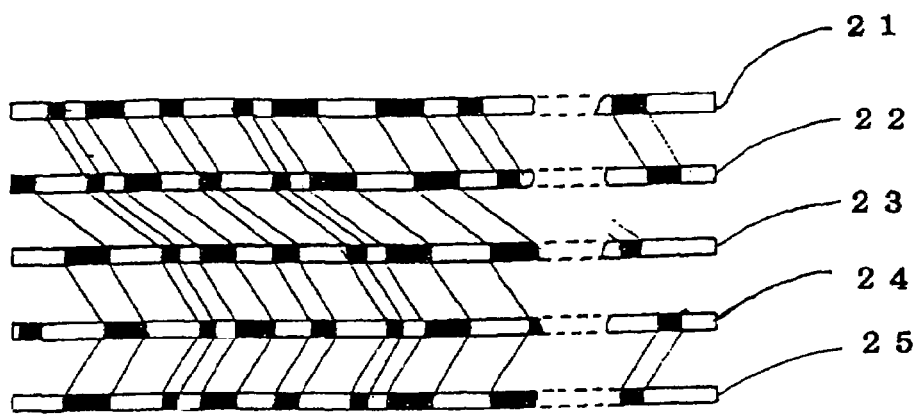
FIG. 5 illustrates the granular speck pattern picked up by the line sensor for an object moving in plane.

Referring to FIG. 5, the video signal 21 represents the object 1 as its initial position and the video signal 22 represents the same object 1 which has then moved rightward with respect to said video signal 21, i.e., said initial position. The next video signal 23 also has further moved rightward but with increasing speed. The following video signal 24 indicates that a speed of movement has decreased and said object 1 which had continued to move rightward has moved leftward.

FIG. 6 shows that the object 1 has moved back-and-forth (i.e., away and toward) with respect to the measuring instrument 15. As illustrated, the respective granular speck patterns 5 corresponding to the video signals 27 and 28 have expanded with respect to the granular speck pattern 5 corresponding to the video signal 26. This means that the object 1 has receded from the measuring instrument 15. The granular speck pattern 5 corresponding to the next video signal 29 has restored the same state as said video signal 26, i.e., its initial state.

The granular speck pattern 5 corresponding to the video signal 30 has contracted from its initial state and indicates that the object 1 has moved from the initial position toward the measuring instrument 15. A distance between the object 1 and the measuring instrument 15 can be determined on the basis of a ratio of such reduction or magnification.

Figure 7:
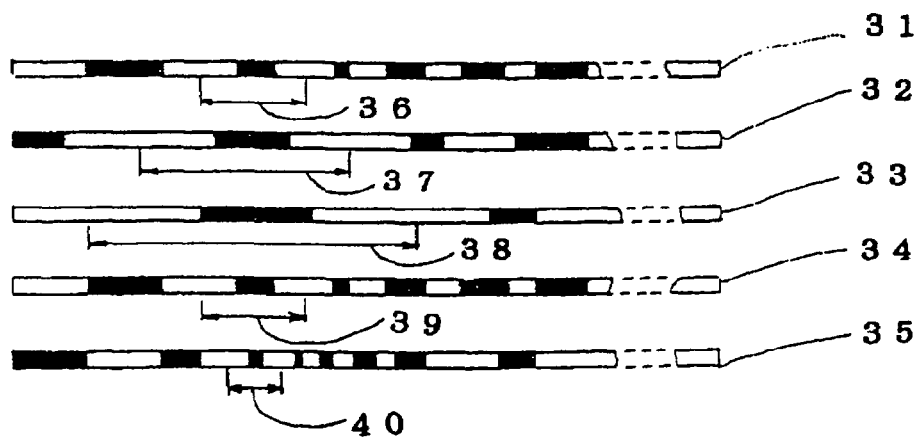
FIG. 7 illustrates a method for calculation of the intercentral distance between each pair of the adjacent specks.

Similarly to FIG. 6, FIG. 7 illustrates that the object 1 has moved back-and-forth with respect to the measuring instrument 15. Referring to FIG. 7, the amount of such back-and-forth movement can be determined on the basis of a varying ratio of the intercentral rectilinear distance connecting each pair of the adjacent specks 5. On the basis of the video signal 31, the video signals 32 and 33 indicate that the object 1 has receded from the measuring instrument 15. The video signal 34 is similar to said video signal 31, indicating that the object 1 has restored its initial position.

The granular speck pattern 5 corresponding to the video signal 35 has said intercentral rectilinear distance contracted with respect to the granular speck pattern 5 corresponding to the video signal 31. The distance between the object 1 and the measuring instrument 15 can be determined on the basis of a varying ratio of said intercentral rectilinear distance.

EFFECT OF THE INVENTION

The present invention enables the amount of movement of the object 1 to be accurately measured in non-contact fashion without demand for a particular index or mark and in an environment like the ordinary office. Conventionally, the measuring environment in the form of the darkroom, the frosted glass 3 on which the object 1 is projected, high resolution lenses and the other complex optical system have been essential to pick up the granular speck pattern 5. On the contrary, the present invention enables the granular speck pattern 5 to be directly picked up as the image by the line sensor 9 so far as the extraneous light shielding tube 8 is placed in front of the element of said line sensor 9. It has been found that the range of the granular speck pattern 5 picked up through the extraneous light shielding tube 8 placed in front of the CCD (Charge-coupled device) corresponds to the range of the granular speck pattern 5 picked up within the effective area of the CCD through the frosted glass.

The method according to the present invention may be used to measure or determine various factors as follows: movement of the object 1 in a plane on the basis of translation of the granular speck pattern 5; back-and-forth movement of the object 1 on the basis of reduction and magnification of the granular speck pattern 5; average speed per unit time of said movement in a plane of the granular speck pattern 5; a time point at which the object 1 begins or ceases to move on the basis of movement of the granular speck pattern 5; a time point at which a mirror-like finishing should be terminated by observing whether an average area of the granular speck pattern 5 varies or not varies as a beam diameter is varied; and a phase of drying or hardening of coating or adhesive on the basis of movement of the granular speck pattern.

It will become apparent to those skilled in the art that various modifications to the preferred embodiment of the invention as described herein can be made without departing from the spirit or scope of the invention as defined by the appended claims.

What is claimed is:

1. A method for measuring the amount which an object to be measured has moved using a granular speck pattern generated by a reflecting laser beam in non-contact fashion comprising steps of:

irradiating an object to be measured with a laser beam;

directly detecting the granular speck pattern generated by the laser beam by a detector in an environment, the environment not being a darkroom, and using the
detected speck pattern as an index;

calculating the amount of movement of the object based
upon the movement of a new granular speck pattern
corresponding to the moved position of the object with
respect to said index; and displaying a result of the calculation as a numerical value
of the measured amount of movement.

2. The method of claim 1 further comprising moving the object toward or away from said detector.

3. The method as defined in claim 1 and further including positioning a light shield in front of said detector.

4. The method as defined in claim 3 wherein said light shield does not interfere with said granular speck pattern detected by said detector.

5. An apparatus for measuring the amount which an object to be measured has moved using a granular speck pattern generated by a reflecting laser beam, said apparatus comprising:

a laser projector to generate a granular speck pattern corresponding to a rough surface of an object to be measured;

a line sensor to directly pick up said granular speck pattern used as an index; an A/D converter coupled to said line sensor to convert an analog signal supplied from said line sensor to a digital signal;

a processing unit coupled to the A/D converter to calculate the amount of movement of said object on the basis of movement of a granular speck in said granular speck pattern with respect to a change in a pixel interval of said granular speck pattern picked up by said line sensor and represented by said A/D converted digital signal; and a display coupled to said processing unit to display the amount of movement calculated by said processing unit;

wherein the line sensor is able to directly pick up the granular speck pattern in an environment that is not a darkroom.

6. The apparatus as defined in claim 5 and further including a light shield positioned in front of said line sensor.

7. The apparatus as defined in claim 6 wherein said light shield does not interfere with said granular speck pattern detected by said detector.

8. The apparatus as defined in claim 7 and further including a light shield positioned in front of said line sensor.

9. An apparatus for measuring the amount which an object to be measured has moved using a granular speck pattern generated by a reflecting laser beam, said apparatus comprising:

a laser projector for generating a granular speck pattern corresponding to the surface of an object to be measured;

a line sensor positioned to detect directly said granular speck pattern as an index; and an electrical circuit coupled to said line sensor for calculating the amount of movement of said object on the basis of movement of a granular speck in said granular speck pattern with respect to a pixel interval of said granular speck pattern picked up by said line sensor and displaying the amount of movement calculated by said electrical circuit;

wherein the line sensor is able to directly pick up the granular speck pattern in an environment that is not a darkroom.

10. The apparatus as defined in claim 9 and further including a light shield positioned in front of said line sensor.

11. The apparatus as defined in claim 10 wherein said light shield does not interfere with said granular speck pattern detected by said detector.

12. The apparatus as defined in claim 11 and further including a light shield positioned in front of said line sensor.

13. A method for measuring the amount which an object to be measured has moved by detecting a granular speck pattern reflected by a laser beam comprising steps of:

irradiating an object to be measured with a laser beam;

directly detecting a granular speck pattern generated by the laser beam by a detector in an environment, the environment not being a darkroom, and using the detected pattern as an index;

moving the object with respect to said detector;

calculating the amount of movement of the object based upon movement of the granular speck pattern corresponding to the moved position of the object with respect to said index; and displaying a result of the calculation as a numerical value of the measured amount of movement.

14. The method of claim 13 further comprising moving the object toward or away from said detector.

15. The method as defined in claim 13 and further including positioning a light shield in front of said detector.

16. The method as defined in claim 15 wherein said light shield does not interfere with said granular speck pattern detected by said detector.

17. An apparatus for measuring the amount which an object to be measured has moved using a granular speck pattern generated by a reflecting laser beam, said apparatus comprising:

a laser source for generating a granular speck pattern corresponding to a rough surface of an object to be measured;

a line sensor positioned to detect directly said granular speck pattern as an index; a processing unit coupled to said line sensor to calculate the amount of movement of said object on the basis of movement of a granular speck in said granular speck pattern with respect to a pixel interval of said granular speck pattern detected by said line sensor; and a display coupled to said processing unit to display the amount of movement calculated by said processing unit;

wherein the line sensor is able to directly pick up the granular speck pattern in an environment that is not a darkroom.

18. The apparatus as defined in claim 17 and further including a light shield positioned in front of said line sensor.

19. The apparatus as defined in claim 18 wherein said light shield does not interfere with said granular speck pattern detected by said detector.

20. The apparatus as defined in claim 19 and further including a light shield positioned in front of said line sensor.

21. An apparatus for measuring the amount which an object to be measured has moved using a granular speck pattern generated by a reflecting laser beam, said apparatus comprising:

a collimated light source for generating a granular speck pattern corresponding to the surface of an object to be measured;

a line sensor positioned to detect directly said granular speck pattern as an index; and an electrical circuit coupled to said line sensor for calculating the amount of movement of said object on the basis of movement of a granular speck in said granular speck pattern with respect to a pixel interval of said granular speck pattern picked up by said line sensor and displaying the amount of movement calculated by said electrical circuit;

wherein the line sensor is able to directly pick up the granular speck pattern in an environment that is not a darkroom.

22. The apparatus as defined in claim 21 and further including a light shield positioned in front of said line sensor.

23. The apparatus as defined in claim 22 wherein said light shield does not interfere with said granular speck pattern detected by said detector.

24. The apparatus as defined in claim 23 and further including a light shield positioned in front of said line sensor.

* * * * *

UNITED STATES PATENT AND TRADEMARK OFFICE
CERTIFICATE OF CORRECTION

PATENT NO. : 7,257,510 B2  Page 1 of 1
APPLICATION NO. : 10/958807
DATED : August 14, 2007
INVENTOR(S) : Kenichiro Kobayashi It is certified that error appears in the above-identified patent and that said Letters Patent is hereby corrected as shown below:

Column 9, claim 8, line 47;
    Cancel claim 8.
Column 10, claim 12, line 7;
    Cancel claim 12.
Column 10, claim 20, line 58;
    Cancel claim 20.
Column 12, claim 24, line 7;
    Cancel claim 24.

Signed and Sealed this

Sixth Day of January, 2009

JON W. DUDAS
*Director of the United States Patent and Trademark Office*